(12) United States Patent
Takeuchi

(10) Patent No.: US 6,337,767 B1
(45) Date of Patent: *Jan. 8, 2002

(54) MICROSCOPE WITH VISIBLE AND ULTRAVIOLET LIGHT ILLUMINATION SYSTEMS

(75) Inventor: Atsushi Takeuchi, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/129,367

(22) Filed: Aug. 5, 1998

(30) Foreign Application Priority Data

Aug. 6, 1997 (JP) ............................. 9-224323

(51) Int. Cl.[7] .............................. G02B 21/00
(52) U.S. Cl. ................. 359/388; 359/368; 359/381
(58) Field of Search ................... 359/353, 361, 359/368, 381, 388, 385

(56) References Cited

U.S. PATENT DOCUMENTS

| | | | | |
|---|---|---|---|---|
| 4,643,540 A | * | 2/1987 | Kawasaki et al. | 359/368 |
| 4,753,525 A | * | 6/1988 | Gaul et al. | 359/388 |
| 4,756,611 A | * | 7/1988 | Yonekubo et al. | 359/370 |
| 5,481,401 A | | 1/1996 | Kita et al. | 359/353 |
| 5,633,752 A | * | 5/1997 | Tsuchiya et al. | 359/390 |
| 5,703,714 A | * | 12/1997 | Kojima | 359/368 |
| 5,717,518 A | * | 2/1998 | Shafer et al. | 359/357 |
| 5,737,134 A | | 4/1998 | Watanabe et al. | 359/821 |

FOREIGN PATENT DOCUMENTS

WO       WO 86 05587 A       9/1986

* cited by examiner

Primary Examiner—Mark A Robinson
(74) Attorney, Agent, or Firm—Finnegan, Henderson, Farabow, Garrett & Dunner, L.L.P.

(57) ABSTRACT

A microscope device has visible light observation and ultraviolet light observation capabilities wherein casting of ultraviolet light on a visible light objective lens can be reliably prevented. The microscope device includes a visible light illumination system that can illuminate a specimen with visible light, an ultraviolet light illumination system that can illuminate a specimen with ultraviolet light, a filter block to switch between a visible light illumination system and an ultraviolet light illumination system for use with the specimen, and observation system for purposes of observing a specimen. An electromotive turret supports a visible light objective lens and an ultraviolet light objective lens and selectively positions the objective lenses into the observation system optical path. A turret drive motor drives the electromotive turret. A filter sensor detects whether the illumination is from an ultraviolet light illumination system. A CPU drives the turret drive motor and inserts an ultraviolet light objective lens in the optical path when the filter sensor has detected that an ultraviolet light illumination system is being used.

10 Claims, 7 Drawing Sheets

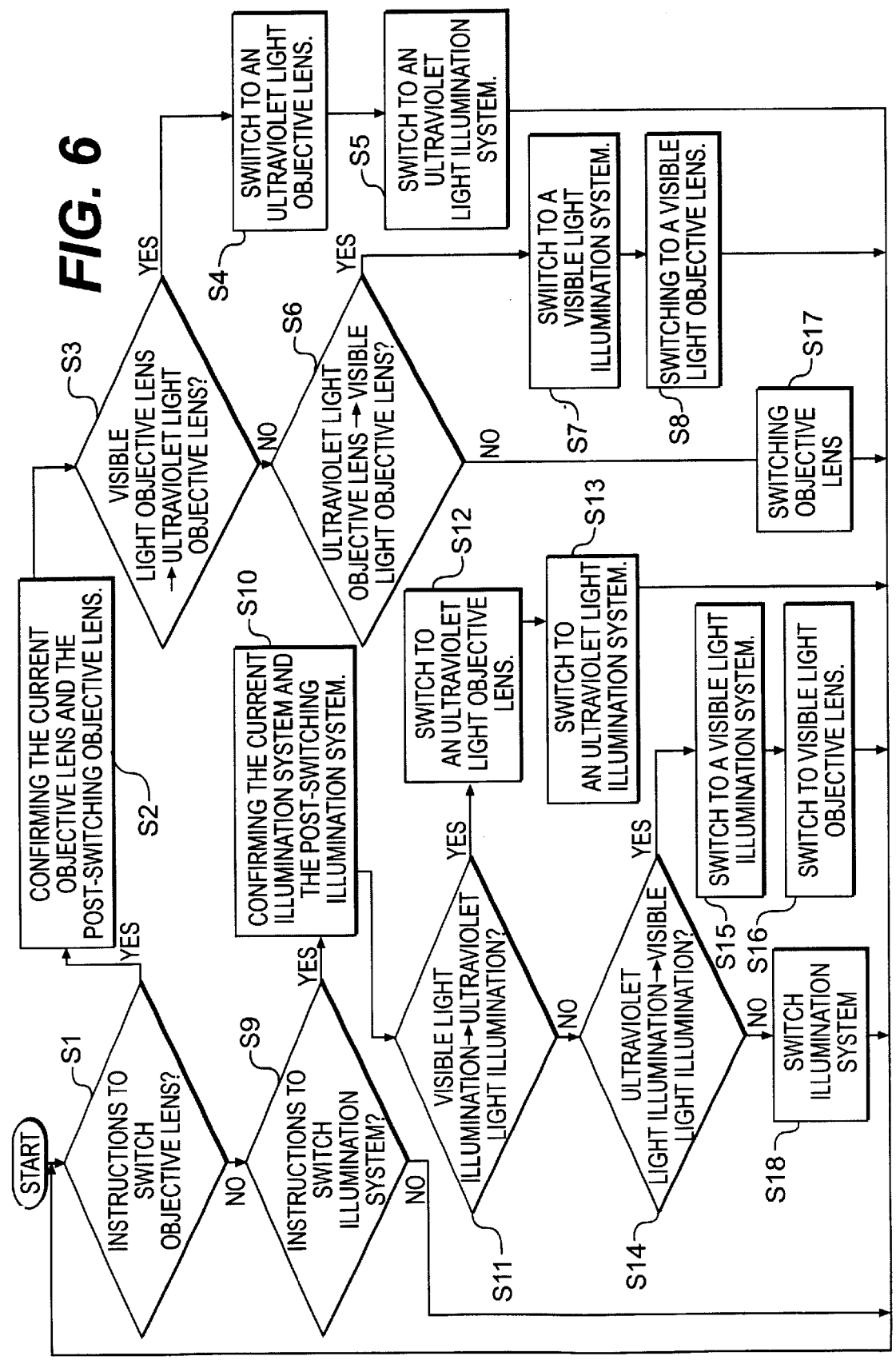

MICROSCOPE WITH VISIBLE AND ULTRAVIOLET LIGHT ILLUMINATION SYSTEMS

CROSS REFERENCE TO RELATED APPLICATION

The present application claims foreign priority from Japanese Patent Application No. Hei 09-224323, filed on Aug. 6, 1997, the content of which is incorporated herein by reference in its entirety.

BACKGROUND OF THE INVENTION

This invention pertains to a microscope. More particularly, the invention relates to a microscope having a visible light illumination system and an ultraviolet light illumination system.

A microscope which allows observation of an ultraviolet light image and a visible light image of a specimen is disclosed in U.S. Pat. No. 5,481,401, for example. That microscope has a visible light illumination system to illuminate a specimen with visible light, an ultraviolet light illumination system to illuminate the specimen with ultraviolet light, a filter block for switching between the visible light illumination system and the ultraviolet light illumination system, an observation system to observe the specimen, an electromotive turret that can retain multiple objective lenses capable of correcting aberrations of specimen image within a wavelength ranging from the visible zone to the near-ultraviolet light zone (about 330 nm) and that selectively positions the objective lenses in an optical path of the observation system, and turret drive means to drive the electromotive turret.

However, if ultraviolet light in the deep ultraviolet light ray zone (about 300 nm or less) is used as illumination light, it is difficult to have only a single objective lens that can cope with the range from visible light to deep ultraviolet light rays. Therefore, both a visible light objective lens and an ultraviolet light objective lens must be used.

There are two types of ultraviolet light objective lenses: ① An objective lens used when ultraviolet light is cast on a specimen and an image is obtained from the light (the ultraviolet light) reflected by the specimen; and ② an objective lens used when ultraviolet light is cast on a specimen and an image is obtained from the fluorescent light (visible light) reflected by the specimen.

In the aforementioned microscope, a visible light objective lens and an ultraviolet light objective lens are attached to an electromotive turret, and visible light images and ultraviolet light images can be observed. When switching from the visible light observation to the ultraviolet light observation occurs, the visible light objective lens must be switched to an ultraviolet light objective lens.

In such cases, the observer must rotate the electromotive turret without any switching errors. If a visible light objective lens is erroneously used under ultraviolet light, adhesives used for the visible light objective lens will cloud up because of ultraviolet light radiation, and the visible light objective lens will no longer be usable.

This problem likewise occurs even when visible light observation and fluorescent light observation involving ultraviolet light illumination are performed with a single microscope by using the ultraviolet light objective lens and the visible light objective lens of type ②.

In the present specification, an "ultraviolet light objective lens" means an objective lens used when ultraviolet rays are used as the illumination light. Also, "ultraviolet light" and "ultraviolet rays" mean light in the wavelength of deep ultraviolet light and near ultraviolet light.

SUMMARY OF THE INVENTION

The objects of the invention are to provide a microscope that allows selection between a visible light objective lens and an ultraviolet light objective lens, that prevents casting of ultraviolet light on visible light objective lenses with certainty, and that has excellent operability.

Additional objects and advantages of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purposes of the invention, as embodied and broadly described herein, the invention includes a microscope having an illumination system for illuminating a specimen with one of visible light and ultraviolet light. A switching device switches the illumination system between the visible light and the ultraviolet light. An observation system is provided for observing the specimen and the observation system has an optical path. An electromotive turret supports a visible light objective lens and an ultraviolet light objective lens, and selectively positions the objective lenses in the optical path. A turret driving device drives the electromotive turret. An illumination system detection device detects whether illumination is ultraviolet light. A control unit triggers the turret driving device to insert the ultraviolet light objective lens in the optical path when the illumination system detection device detects illumination of the specimen in the ultraviolet light.

In another aspect of the invention, the objects and advantages of the invention are attained by a microscope including an illumination system for illuminating a specimen with one of visible light and ultraviolet light. A switching device switches the illumination system between the visible light and the ultraviolet light. A switching drive device drives the switching device. An observation system is provided for observing the specimen and the observation system has an optical path. A turret supports a visible light objective lens and an ultraviolet light objective lens, and selectively positions the objective lenses in the optical path. An objective lens detection device detects the visible light objective lens in the optical path. A control unit triggers the switching drive device to switch to the visible light when the objective lens detection device detects the visible light objective lens in the optical path.

In yet another aspect of the invention, a microscope includes an illumination system for illuminating a specimen with one of visible light and ultraviolet light. A shading device prevents the ultraviolet light from being cast on the specimen. The shading device is located in the ultraviolet light illumination system. A shading drive device is provided to drive the shading device. An observation system is provided for observing the specimen, and the observation system has an optical path. An electromotive turret supports a visible light objective lens and an ultraviolet light objective lens, and selectively positions the objective lenses in the optical path. A turret driving device drives the electromotive turret. An instruction device instructs switching of the objective lenses. A control unit triggers the shading drive device to block the ultraviolet light and subsequently triggering the turret driving device to switch to the visible light objective lens when the instruction device instructs to switch from the ultraviolet objective lens to the visible objective lens.

In still another aspect of the invention, a microscope includes an illumination system for illuminating a specimen with one of visible light and ultraviolet light. A switching device switches between the visible light illumination system and the ultraviolet light illumination system for illuminating the specimen. A switching drive device drives the switching device. An observation system is provided for observing the specimen, and the observation system has an optical path. An electromotive turret supports a visible light objective lens and an ultraviolet light objective lens, and selectively positions the objective lenses in the optical path. A turret driving device drives the electromotive turret. An instruction device instructs switching of illumination system. An illumination system detection device detects which illumination system is used. A control unit triggers the turret driving device to position the ultraviolet objective lens and subsequently triggering the switching drive device to switch to the ultraviolet light illumination system when the illumination system detection device detects use of the visible light illumination system is being used and the instruction device instructs switching to the ultraviolet light objective lens.

In yet another aspect of the invention, a microscope includes an illumination device for providing a light to a specimen. A filter block has a first filter and a second filter and being connected to a filter block motor to place one of the first and second filters in the light. The first filter is configured to filter out ultraviolet light from the light and provide visible light, and the second filter is configured to provide ultraviolet light. An observation system has an optical path for observing the specimen. An electromotive turret supports a visible light objective lens and an ultraviolet light objective lens, and selectively positions the objective lenses in the optical path, and the electromotive turret is revolved by a turret motor. A control unit triggers the filter block motor and the turret motor to arrange the first filter and the visible light objective lens for observing the specimen, and the control unit also triggers the filter block motor and the turret motor to arrange the second filter and the ultraviolet light objective lens for observing the specimen.

In yet another aspect of the invention, a microscope includes an illumination system for illuminating a specimen with one of visible light and ultraviolet light. A switching device switches the illumination system between the visible light and the ultraviolet light. An observation system is provided for observing the specimen, and the observation system has an optical path. A turret supports a visible light objective lens and an ultraviolet light lens, and selectively positions the objective lenses in the optical path. A control unit prevents an ultraviolet light system and a visible light objective lens from being simultaneously positioned in the optical path.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings, FIG. 1 a structural block diagram showing one embodiment of the control system of a microscope according to this invention;

FIG. 6 is a flow chart to explain another embodiment of a control method for a microscope according to the present invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the invention, a microscope includes an illumination system a specimen with one of visible light and ultraviolet light. A switching device is provided to switch the illumination system between the visible light and the ultraviolet light. An observation system is provided to observe the specimen, and the observation system has an optical path. An electromotive turret supports a visible light objective lens and an ultraviolet light objective lens, and selectively positions the objective lenses in the optical path. A turret driving device drives the electromotive turret. An illumination system detection device detects whether illumination is ultraviolet light. A control unit triggers the turret driving device to insert the ultraviolet light objective lens in the optical path when the illumination system detection device detects illumination of the specimen in the ultraviolet light.

Figure 1:
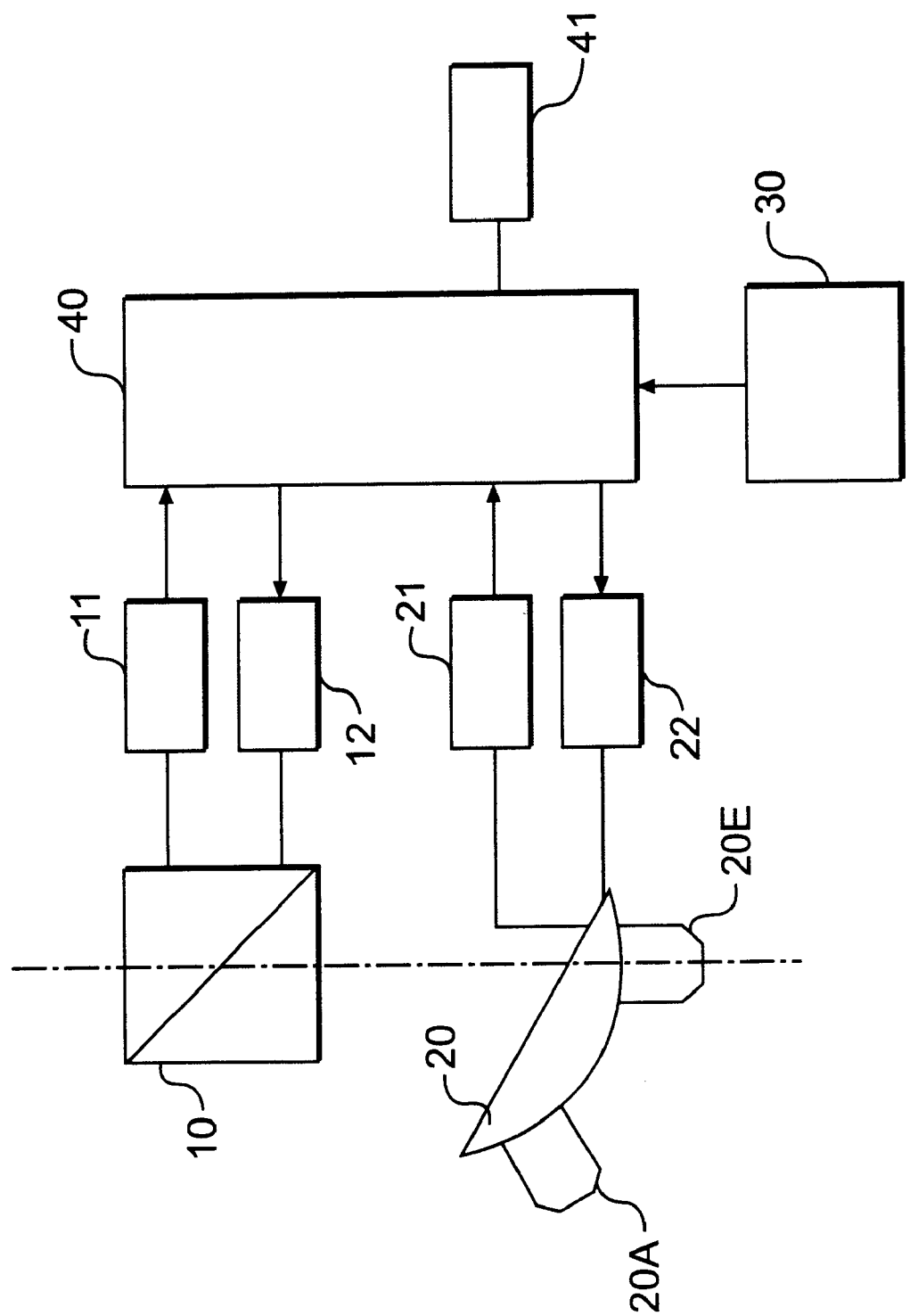

FIG. 1 is a block diagram illustrating a control system embodiment for the microscope in the present invention. The microscope includes a filter block (switching device) 10, a filter sensor (illumination system detection device) 11, a filter drive motor (switch drive device) 12, an electromotive turret 20, an objective lens sensor (objective lens detection device) 21, a turret drive motor (turret drive device) 22, an operating component (instruction device) 30, and a CPU (control unit) 40. CPU 40 also has the objective lens detection device and the illumination system detection device.

As can be seen in FIG. 1, filter block 10 is connected to CPU 40 through the filter sensor 11 and filter drive motor 12. Using a photo sensor, for example, filter sensor 11 detects the illumination system currently in use by detecting the position of filter block 10. Filter drive motor 12 moves filter block 10 based on an output from CPU 40, and switches the illumination system for a specimen (not shown in FIG. 1) between visible light and ultraviolet light.

Electromotive turret 20 is connected to CPU 40 through objective lens sensor 21, and it is also connected to CPU 40 through turret drive motor 22. Electromotive turret 20 is, for example, outfitted with visible light objective lenses 20A–20D (20B–20D are not shown in FIG. 1, but see FIG. 4) and an ultraviolet light objective lens 20E. Objective lens sensor 21 detects the objective lens positioned in an optical path of an observation system. Specifically, the rotational position of electromotive turret 20 retaining the objective lenses is detected by a lot number preassigned to multiple mounts in which the objective lenses are attached. Besides this structure, the detection of the objective lens in the optical path may also be performed by reading signals, e.g., bar codes, attached to the objective lenses. Turret drive motor 22 drives electromotive turret 20 based on the output from CPU 40 and switches the objective lens.

An operation component 30 is connected to CPU 40 and has buttons (not shown) to instruct switching of the illumination system and the objective lens, etc. Based on the data, stored in a memory 41, about the locations of the objective lens and appropriate match of the illumination systems and the objective lenses, etc., CPU 40 properly arranges the objective lenses and the illumination systems.

Figure 2A:
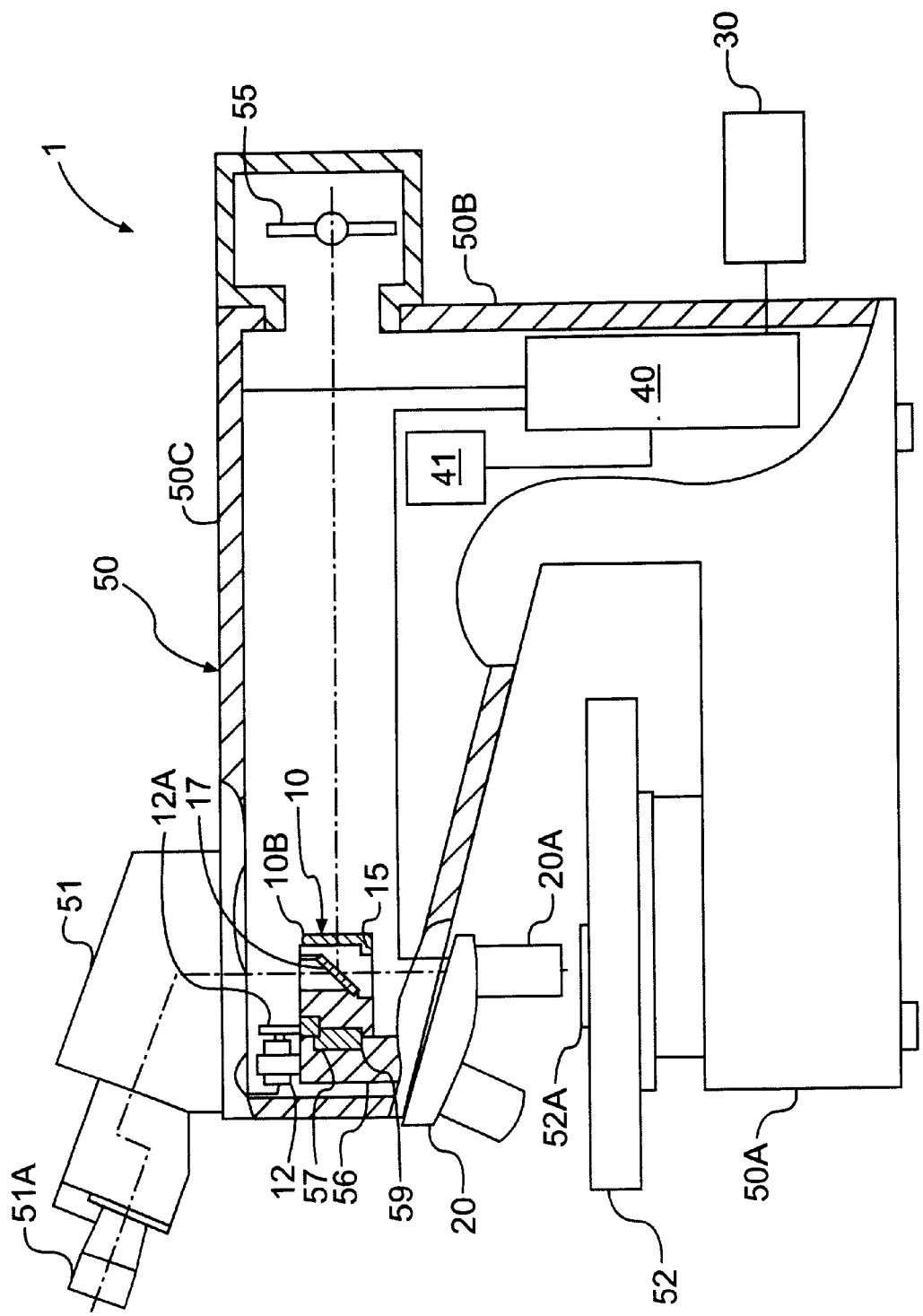
FIG. 2a is a cross sectional view of a first embodiment of a microscope in which a visible light illumination system is used according to the invention.
Figure 2B:
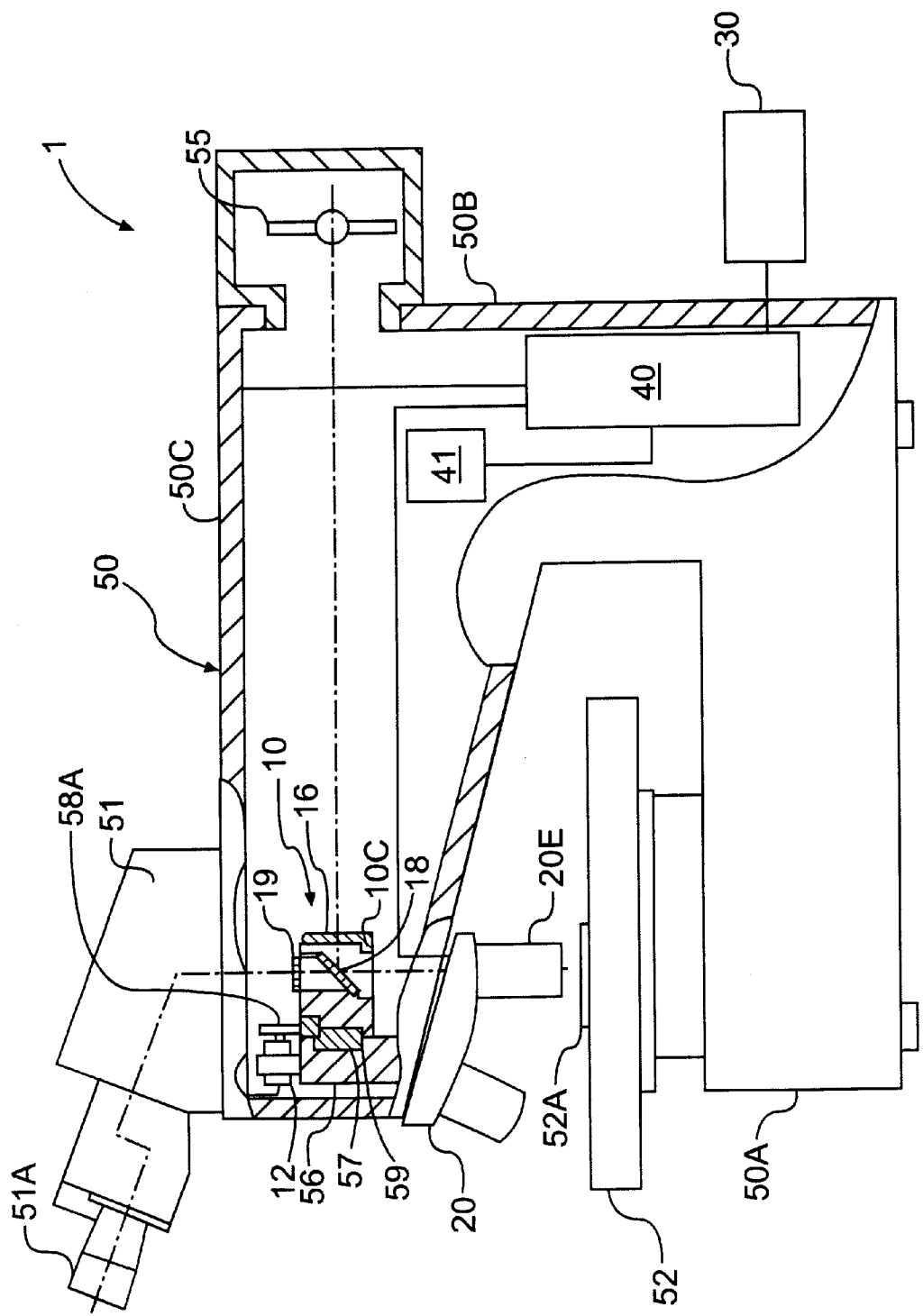
FIG. 2b is a cross sectional view of the microscope in FIG. 2a in which an ultraviolet light illumination system is used.
Figure 3:
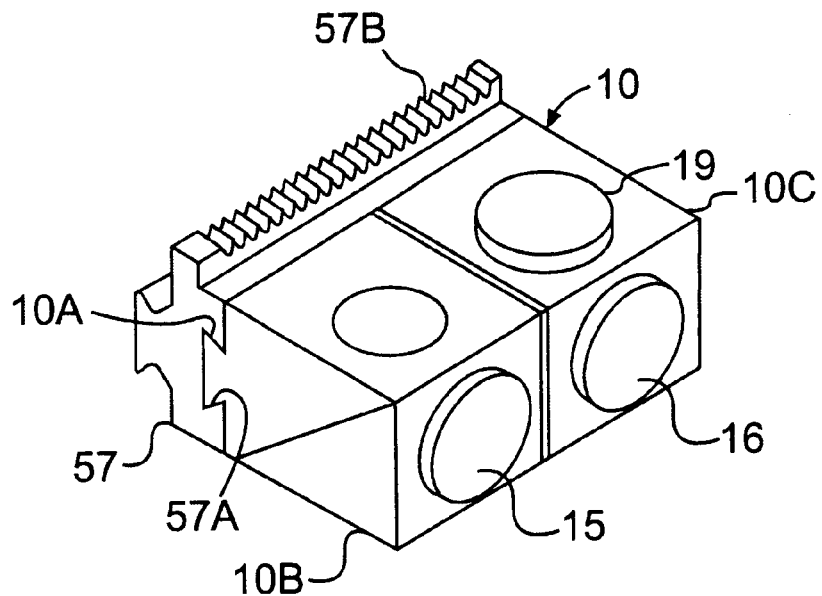
FIG. 3 is a perspective view of one embodiment of a filter block according to the invention.
Figure 4:
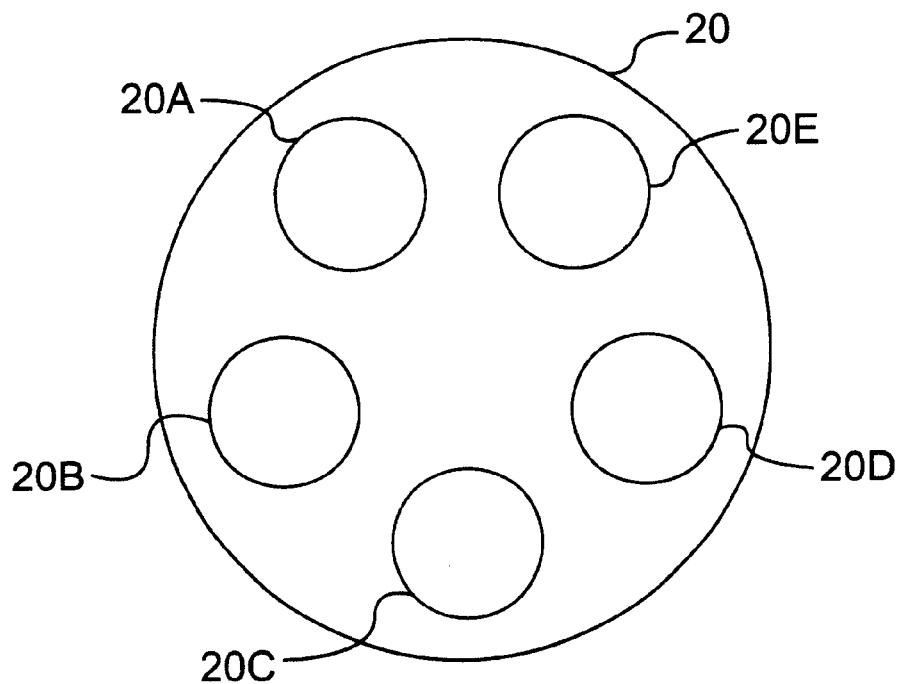
FIG. 4 shows one embodiment of the positioning of objective lenses in an electromotive turret according to the invention.

FIG. 2a and 2b illustrate a microscope 1 for visible light illumination observation and ultraviolet light illumination observation, respectively. Also, FIG. 3 is a perspective view of a filter block 10. FIG. 4 illustrates the positioning of the objective lenses in the electromotive turret. The present embodiment is an example in which the aforementioned lens type ②, i.e., an objective lens used to create a fluorescent light (visible light) image from a specimen when ultraviolet light is cast on the specimen, is used as the ultraviolet objective lens.

As illustrated in FIGS. 2a and 2b, microscope 1 has a microscope main body 50, a lens barrel 51, an electromotive turret 20, a stage 52, and an operating member 30. Microscope main body 50 comprises a base 50A, a support column 50B, and an arm 50C. Lens barrel 51 is attached to the upper part of arm 50C and has an ocular lens 51A. Electromotive turret 20 is attached to the underside of arm 50C. In this embodiment, electromotive turret 20 supports five objective lenses, but the electromotive turret may support other numbers of the objective lenses. Objective lenses 20A–20D are used for visible light, while objective lens 20E is for fluorescent light, and compatible to ultraviolet light.

A stage 52 is provided on base 50A, and moves vertically along the optical axis of the objective lenses. Also, arm 50C is provided with filter block 10 and an illumination light source 55. Filter block 10 can move orthogonally with respect to the optical path of light source 55 (i.e., in the direction of moving in and out of the drawing), and places one of an ultraviolet ray cutting filter 15 and an excitation filter 16 in the illumination optical path. A mercury lamp is preferably used for light source 55. This mercury lamp can cast light in a wavelength range that extends from the visible area to the deep-ultraviolet area.

Housed in arm 50C are a stationary guide component 56, a mobile guide component 57, a filter drive motor 12, and filter block 10. Mobile guide component 57 and stationary guide component 56 are connected by a ball race mechanism that movably supports multiple balls 59.

A dovetail groove 57A is formed on the side surface of stationary guide component 56 opposite mobile guide component 57. Dovetail groove 57A is meshed with a dovetail 10A formed in the side surface of filter block 10. A rack 57B is formed in the upper part of mobile guide component 57. Rack 57B engages a pinion 12A fixed to the rotating axle of motor 12. A DC motor, for example, is used as motor 12 and is fastened to stationary guide component 56.

Filter block 10 acts as a shading device (switching device) and includes a visible field block 10B and a fluorescent block 10C. As shown in FIG. 2a, visible field block 10B has ultraviolet light cutting filter 15 and a half mirror 17. As shown in FIG. 2b, fluorescent block 10C has excitation light filter 16, a dichroic mirror 18, and a barrier filter 19. Motor 22 that drives electromotive turret 20 (see FIG. 1) and motor 12 are connected to CPU 40, and CPU 40 regulates supply of power to both motors.

In a microscope of the present invention, when CPU 40 determines that objective lens 20A, used for visible field light, is positioned based on optical signals from objective lens sensor 21, CPU 40 emits signals to position visible field block 10B in the optical path and triggers motor 12 to position visible field block 10B in the optical path (see FIG. 2a). When CPU 40 determines that ultraviolet light objective lens 20E is positioned in the optical path, CPU 40 emits signals to position fluorescent block 10C in the optical path, motor 12 to position fluorescent block 10C in the optical path (see FIG. 2b).

Also, when CPU 40, owing to detection signals from filter sensor 11, determines that visible field block 10B is positioned in the optical path, CPU 40 emits signals to position a visible light objective lens (e.g. 20A) in the optical path, and triggers motor 22 to position objective lens 20A in the optical path. (see FIG. 2a) When CPU 40 determines that fluorescent block 10C is positioned in the optical path, CPU 40 emits signals to position an ultraviolet objective lens 20E in the optical path, and triggers motor 22 to position an objective lens for ultraviolet light is positioned in the optical path. (see FIG. 2b).

Therefore, when either the objective lens or the illumination system is switched electromotively or manually, the other one of the objective lens or the illumination system switches automatically, to maintain a combination of the visible light illumination and the visible light objective lens, or a combination of the ultraviolet light illumination and the ultraviolet light objective lens.

In FIG. 2a, illumination light from light source 55 is directed into visible field block 10B through an illumination optical system, such as a corrector lens. (not shown in the figure) Ultraviolet ray cutting filter 15 removes ultraviolet light from the illuminating light so the illumination light turns into visible light. The visible light is then deflected to objective lens 20A by half mirror 17, passes through objective lens 20A, and illuminates specimen 52A on a stage 52 (visible light illumination system). An image obtained by the visible light illumination system passes through objective lens 20A and half mirror 17, which are components of the observation system, and then, through the lens barrel, and the image can be observed in visible light through ocular lens 51A.

In FIG. 2b, the illumination light becomes ultraviolet light only by passing through excitation filter 16. The ultraviolet light is deflected to objective lens 20E by dichroic half mirror 18, passes through objective lens 20E, and illuminates a specimen 52A on stage 52 (ultraviolet light illumination system). A fluorescent image obtained by the ultraviolet light illumination system passes through objective lens 20E, dichroic mirror 18, and barrier filter 19, which are components of the observation system. Then the fluorescent light can be observed via lens barrel 51 through ocular lens 51A.

In the described first embodiment of a microscope that can select visible light observation or fluorescent observation under ultraviolet light, filter block 10 can be chosen to correspond with the selected filter lens. Moreover, the objective lens can be selected to correspond with selected filter block 10. Thus, accidental casting of ultraviolet light into visible light objective lenses 20A–20D, which results in clouding up of the adhesives and the inability to use objective lenses 20A–20D, can be avoided. Also, the microscope in this invention alleviates problems of self-emission of fluorescent light by objective lenses 20A–20D due to wrong objective lens selection, which render specimens difficult to see.

Further, because switching objective lenses 20A–20E and switching an illumination system can be done in a one-time operation, operational errors caused by unfamiliar observers are reduced, and the operability is improved. As a result, observation time can be shortened and examinations are more accurate.

Figure 5A:
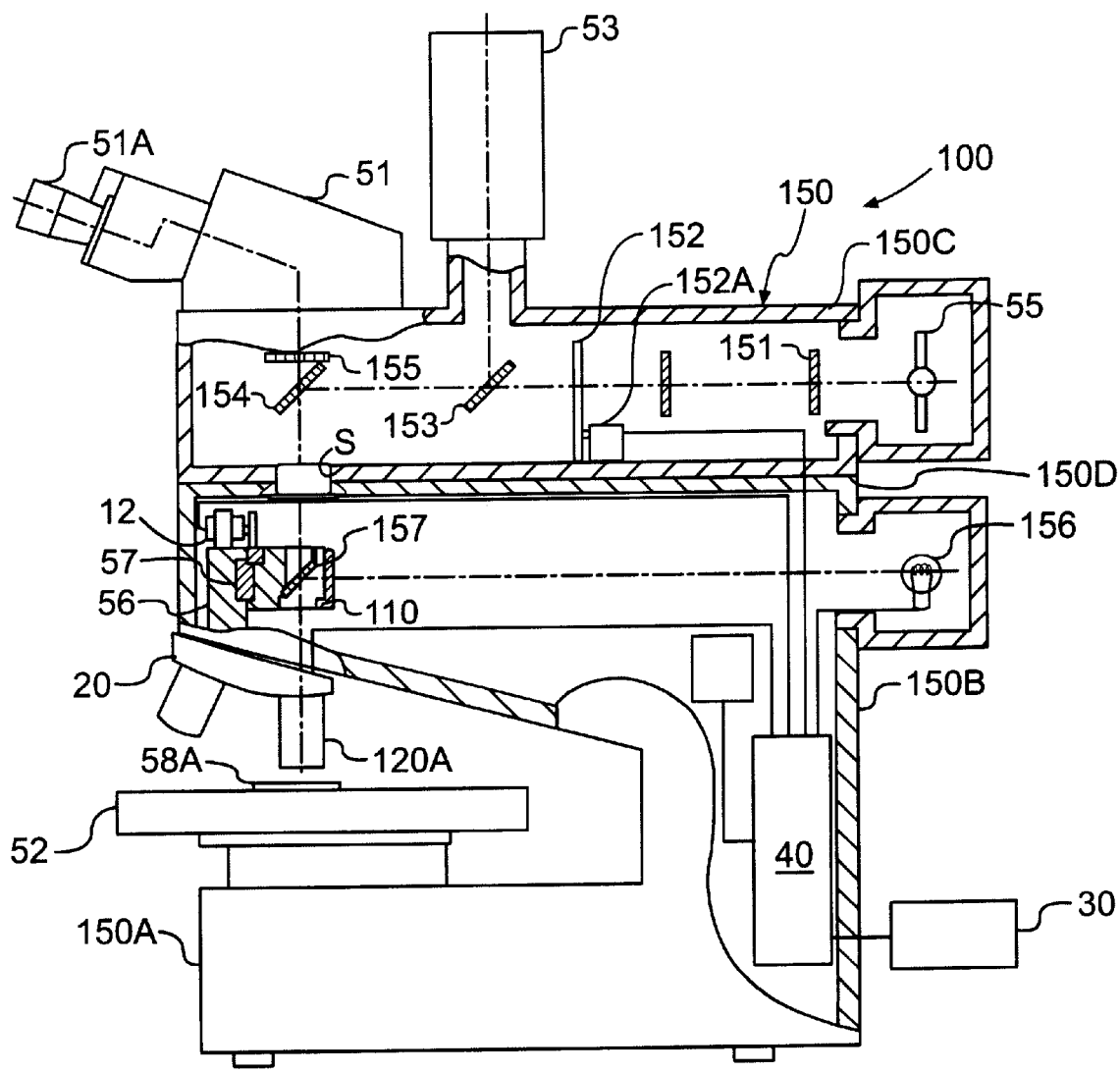
FIG. 5a is a cross sectional view of a second embodiment of a microscope in according to the invention.
Figure 5B:
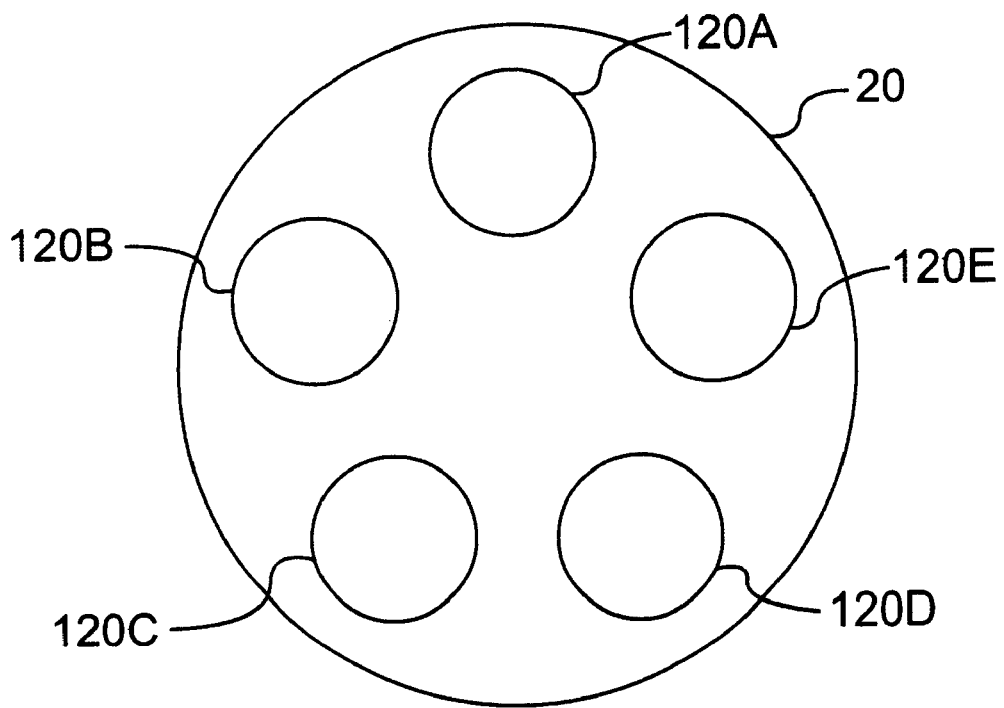
FIG. 5b shows one embodiment of objective lenses in an electromotive turret according to the invention.

FIG. 5a is a cross sectional view of a second embodiment of a microscope of the invention. FIG. 5b shows the positioning of objective lenses in the electromotive turret.

In the second embodiment of the invention, a microscope 100 permits visible field observation using visible light, as well as the observation of ultraviolet light images using deep-ultraviolet light (DUV light) of 300 nm or less. This embodiment is an example in which the aforementioned lens type ②, i.e., an objective lens used to create a reflected light (ultraviolet light) image from a specimen when ultraviolet light is cast on the specimen, is used as the ultraviolet objective lens.

Microscope 100 includes a microscope main body 150, a lens barrel 51, an electromotive turret 20, a stage 52, an ultraviolet ray detector 53, and an operating component 30. Microscope main body 150 comprises a base 150A, a support column 150B, and arms 150C and 150D.

Lens barrel 51 is attached to the upper part of arm 150C and has an ocular lens 51A. Electromotive turret 20 is attached to the underside of arm 150D. Turret 20 supports, for example, five objective lenses 120A–120E. Objective lenses 120A–120D are used for visible light, and objective lens 120E is used for ultraviolet rays. Positioned in arm 150C are a mercury lamp 55, a UV filter 151, a shutter (shading device) 152, a half mirror 153, a dichroic mirror 154, and a barrier filter 155. Positioned in arm 150D are a halogen lamp 156 and a filter block 110 that has a half mirror 157. Shutter 152 is driven by a solenoid 152A. The dovetail formed in the underside of arm 150C meshes with a dovetail groove formed in the topside of arm 150D. Also, arms 150C and 150D communicate through an aperture S. This aperture S forms an optical path between dichroic mirror 154 and half mirror 157. Motor 22 (see FIG. 1) that drives electromotive turret 20, motor 12, solenoid 152A, and halogen lamp 156 are all connected to CPU 40, and CPU 40 regulates their power.

If, for example, in microscope 100, CPU 40 determines that a visible light objective lens 120A is positioned in the optical path, CPU 40 emits signals to close shutter 152, triggers the solenoid 152A to close an optical path of the ultraviolet ray. CPU 40 also emits signals to position half mirror 157 in the optical path, and triggers motor 12 to position half mirror 157 in the optical path 157. (see FIG. 5a) If CPU 40 determines that ultraviolet light objective lens 120E is positioned in the optical path, CPU 40 emits signals to remove half mirror 157 from the optical path, motor 12 and triggers to remove half mirror 157 from the optical path. CPU 40 also emits signals to open shutter 152, and triggers solenoid 152A to open an optical path of the ultraviolet light ray. At this time, the power to halogen lamp 156 is shut and halogen lamp 156 goes out.

As shown in FIG. 5, under the visible light observation, illumination light from light source 156 casts on half mirror 157 via an illumination optical system, such as a corrector lens. (not shown in the figures) The illumination light is deflected to objective lens 120A by half mirror 157 and specimen 52A is illuminated through objective lens 120A (visible light illumination system). An image obtained by the visible light illumination systems can be observed by visible light through lens barrel 51, ocular lens 51A, objective lens 120A, half mirror 157, dichroic mirror 154, and barrier filter 154, which are a part of the observation system. However, under ultraviolet ray observation with DUV light, the illumination light becomes only ultraviolet light by UV filter 151. After the light permeates half mirror 153, the light is deflected in the direction of objective lens 120E by dichroic mirror 154, passes through objective lens 120E, and illuminates specimen 52A on stage 52.

Ultraviolet light images created by the illumination of an ultraviolet light illumination system are deflected toward half mirror 153 by objective lens 120E and the dichroic mirror, which are components of the observation system. Ultraviolet light images are then deflected toward ultraviolet ray detector 53 by half mirror 153. Ultraviolet ray detector 53 converts detected ultraviolet light into electrical signals. As a result, an image is generated on the monitor (not shown in the figures) for observation. This second embodiment has the same advantages as those of the first embodiment.

FIG. 6 is a flow chart to explain another embodiment of the control method for the microscope in the present invention. S1–S16 indicate the steps of the processes that the CPU performs. CPU 40 determines whether instructions to switch the objective lens have been input from operating component 30. (S1) When the instructions to switch the objective lens have been input, then both the objective lens currently in the optical path and the post-switching objective lens (the lens that will be inserted subsequently into the optical path) can be confirmed. (S2) Based on objective lens sensor 21, operating component 30, and data stored in memory 41, a determination is made as to whether the instructions are to switch from a visible light objective lens to an ultraviolet light objective lens. (S3) If switching from a visible light objective lens to an ultraviolet light objective lens is instructed, motor 22 is triggered and the objective lens is switched to an ultraviolet light objective lens. (S4) Next, motor 12 is triggered to switch filter block 10 to an ultraviolet light illumination system. (S5) Then the process is returned to step S1. In step S3, if there are no instructions to switch from a visible light objective lens to an ultraviolet light objective lens, a determination is made as to whether the instructions are to a switch from an ultraviolet light objective lens to a visible light objective lens. (S6) If switching from an ultraviolet light objective lens to a visible light objective lens is instructed, motor 12 is driven to switch filter block 10 to a visible light illumination system. (S7) Then, motor 12 is driven to switch objective lens to a visible light objective lens. (S8) Then the process is returned to step S1. When it is determined in step S6 that the switch from an ultraviolet objective lens to a visible light objective lens has not been instructed, the switching of the objective lens will be performed according to the instructions of the operating component 30. (S17) Then the process is returned to step S1. If, in step S1, there are no instructions to switch the objective lenses, a determination is made as to whether instructions have been input to switch the illumination system (filter block). (S9) When no such instructions exist, the process goes to step S1, and steps S1 and S9 are repeated until there are no instructions to switch the objective lenses or the illumination systems.

When the instructions are input to switch the illumination system, the current illumination system and the post-switch illumination system are checked. (S10) Next, a determination is made as to whether the instructions are to switch from a visible light illumination system to an ultraviolet light illumination system. (S11) If the instructions are to switch from a visible light illumination system to an ultraviolet light illumination system, motor 22 is driven and an objective lens inserted in the optical path is switched to an ultraviolet light objective lens. (S12) Then, motor 12 is driven to switch the illumination system to an ultraviolet light illumination system. (S13) Then the process is returned to step S1.

At step S11, if the instructions are not to switch to an ultraviolet light illumination system from a visible light illumination system, a determination is made as to whether a switch from an ultraviolet light illumination system to a visible light illumination system has been instructed. (S14) If switching from an ultraviolet light illumination system to a visible light illumination system has been instructed, motor 12 is driven to switch the illumination system to a visible light illumination system. (S15) Then, motor 22 is driven to switch the objective lens to a visible light objective lens. (S16) Then the process is returned to step S1. In step S14, if it is determined that no switch has been instructed from an ultraviolet light illumination system to a visible light illumination system, the illumination system can be switched by instructions from operating component 30. (S18) Then the process is returned to step S1.

The control method of the second embodiment provides similar results to those the control methods of the first embodiment. With the control method in the second embodiment, a visible light objective lens and an ultraviolet light illumination system cannot be simultaneously positioned in the optical path. Therefore, casting ultraviolet light on a visible light objective lens can be reliably prevented.

Also, because the visible light observation does not take place while ultraviolet objective lens 120E is inserted in the optical path, and the ultraviolet light observation does not take place while a visible light objective lens is inserted in the optical path, accidents, such as breaking of the objective lens and the specimen by the movement of stage 52 in the direction of Z axis, can be avoided. These accidents often occur because aberration correcting lens 120E, which is for observing ultraviolet light images, does not have a focal point for visible light and for ultraviolet light.

Also, if operation component 30 instructs to switch from ultraviolet light objective lens 20E to visible light objective lenses 20A–20D and filter sensor 11 detects that an ultraviolet light illumination system is used, or if operation component 30 instructs to switch from a visible light illumination system to an ultraviolet light illumination system and objective lens sensor 21 detects that visible light objective lens 20E is positioned in the optical path, the microscope should ignore the instructions by operating component 30. Also, the microscope can be equipped with an alarm (not shown in the figures) to catch the observer's attention.

In another embodiment, the filter block and the electromotive turret may be driven by a motor. It is also suitable, however, if one or the other is designed to be manually operated.

In the second embodiment, a driving component may be provided to insert and remove dichroic mirror 154 in the optical path. During the visible light observation, for example, dichroic mirror 154 can be removed from the optical path. Moreover, a shutter can be positioned in the optical path to shade the optical path, instead of turning off halogen lamp 156.

Also, switching of filter block 110 occurs by detecting the position of the filter block. The switching can be performed by switching the opening and closing of shutter 152. Also, an ultraviolet laser can be used in place of a mercury lamp as the ultraviolet light source.

According to the present invention, a microscope is provided such that the casting of ultraviolet light onto a visible light objective lens is prevented, and accidents, such as adhesives clouding up and objective lenses becoming unusable, can be prevented with certainty. Also, the poor visibility results from fluorescent light by an inappropriate objective lens can be prevented.

Moreover, under the ultraviolet light observation, no visible field objective lens can be mistakenly inserted in the optical path. Thus, damages to the specimen or objective lens, which result from moving the stage along the Z axis to focus the image, are preventable.

Furthermore, visible field observation cannot occur while an ultraviolet ray objective lens intended for observing ultraviolet images is inserted in the optical path. Therefore, again, damages to the specimen or objective lens, which result from moving the stage along the Z axis to focus the image, are preventable.

Moreover, switching the objective lens and switching the illumination system can occur in a single operation. Even inexperienced observers can operate the microscope without mistakes. Thus, the microscope has improved operability and provides efficient observation time accurate observations.

It will be apparent to those skilled in the art that various modifications and variations can be made in the microscope of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. An ultraviolet microscope capable of switching between visible light observation and ultraviolet light observation, comprising:

an illumination system for illuminating a specimen with one of visible light and ultraviolet light, the ultraviolet light having a wave length of 300 nm or less;

a shading device for preventing the ultraviolet light from being cast on the specimen, the shading device being located in the ultraviolet light illumination system;

a shading drive device for driving the shading device;

an observation system for observing the specimen, the observation system having an optical path;

an electromotive turret for supporting a visible light objective lens and an ultraviolet light objective lens, and for selectively positioning the objective lenses in the optical path;

a turret driving device for driving the electromotive turret;

an instruction device for instructing switching between the visible light observation and the ultraviolet light observation; and a control unit for triggering the shading drive device to block the ultraviolet light and subsequently triggering the turret driving device to switch to the visible light objective lens when the instruction device instructs to switch from the ultraviolet light observation to the visible light observation.

2. The microscope of claim 1, further comprising recording device for recording locations of each of the objective lenses in the turret, and the control unit determining whether the objective lenses currently positioned in the optical path, and another objective lens to be positioned subsequently in the optical path are a visible light objective lens or an ultraviolet light objective lens based on the instruction device and information recorded in the recording device.

3. The microscope of claim 1, wherein each of the visible light illumination system and the ultraviolet light illumination system has an independent light source, and the shading device is a shutter located in the optical path of the ultraviolet light illumination system.

4. The microscope of claim 1, wherein both of the visible light illumination system and the ultraviolet light illumination system have mutual light source and optical path, and the shading device has a switching device located in the optical path and provided to switch between the visible light and the ultraviolet light for illuminating the specimen.

5. An ultraviolet microscope for viewing a specimen, comprising:
    an electromotive turret for supporting a visible light objective lens and an ultraviolet light objective lens, the turret selectively positioning one of the visible light objective lens and the ultraviolet light objective lens in an optical path;
    an illumination system having a light source for illuminating the specimen with one of visible light and ultraviolet light, the ultraviolet light having a wave length of 300 nm or less;
    an instruction device for instructing the visible light illumination and the ultraviolet light illumination; and
    a control unit for triggering switching of the illumination system to the visible light for the ultraviolet light and subsequently triggering switching of the visible light objective lens for the ultraviolet light objective lens in the optical path when the instruction device instructs the switching of the illumination system to the visible light illumination from the ultraviolet light illumination.

6. The microscope of claim 5, further comprising a filter block having a first filter configured to block passages of the ultraviolet light and pass the visible light, and a second filter configured to provide the ultraviolet light, the first filter and the second filter being switched based on the switching of the illumination system.

7. An ultraviolet microscope for viewing a specimen, comprising:
    an electromotive turret for supporting a visible light objective lens and an ultraviolet light objective lens, the turret selectively positioning one of the visible light objective lens and the ultraviolet light objective lens in an optical path;
    a visible light illumination system having a visible light source for illuminating the specimen with visible light;
    an ultraviolet light illumination system having an ultraviolet light source for illuminating the specimen with ultraviolet light, the ultraviolet light having a wave length of 300 nm or less;
    an instruction device for instructing the visible light illumination and the ultraviolet light illumination;
    a shading device for preventing the ultraviolet light from being cast on the specimen; and
    a control unit for triggering the shading device to prevent the ultraviolet light from being cast on the specimen and subsequently triggering switching of the objective lenses to the visible light objective lens from the ultraviolet light objective lens in the optical path when the instruction device instructs the switching of the illumination system to the visible light illumination from the ultraviolet light illumination.

8. The microscope of claim 7, wherein the visible light illumination system and the ultraviolet light illumination system have a mutual light source.

9. The microscope of claim 7, wherein the ultraviolet illumination system has a filter and the shading device has a shutter located between the ultraviolet light source and the filter.

10. The microscope of claim 7, wherein the ultraviolet light illumination system is located on the visible light illumination system, the optical path of the visible light from the visible light source is reflected by a visible light block to the visible light objective lens, the optical path of the ultraviolet light from the ultraviolet light source is reflected by an ultraviolet light block to the ultraviolet light objective lens, the ultraviolet light block is located on the visible light block, and the optical path of the visible light and the optical path of the ultraviolet light partly share a common path.

* * * * *